July 13, 1943.  C. H. SCHLESMAN  2,324,270
MEANS FOR COMPARATIVE SPECTRAL ANALYSIS
Filed Aug. 28, 1940  2 Sheets-Sheet 2
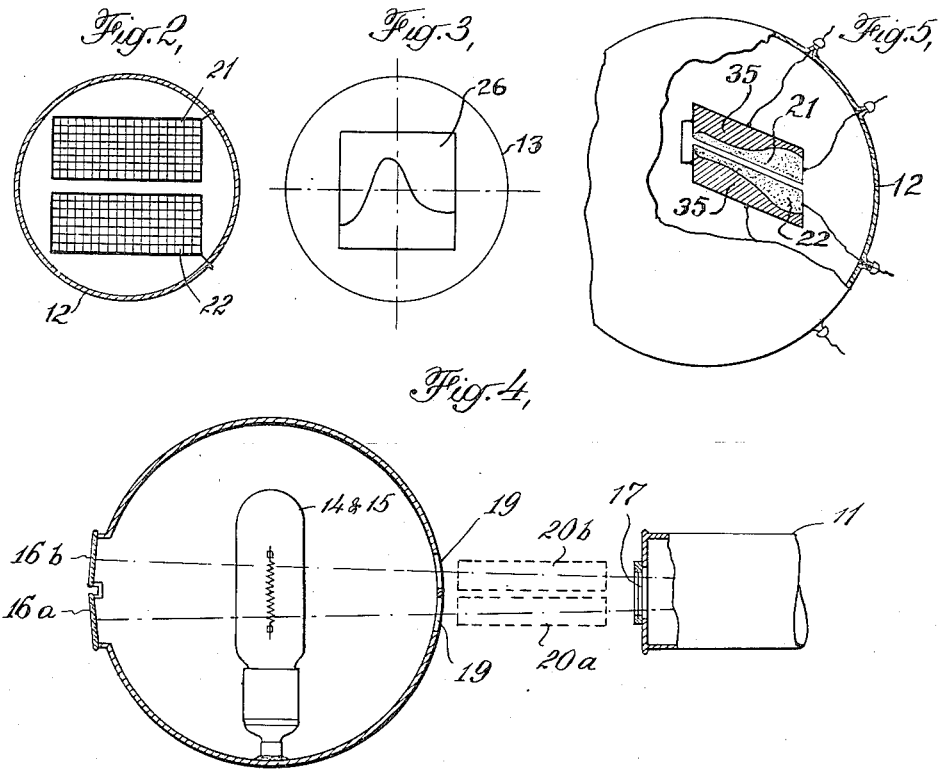
INVENTOR
CARLETON H. SCHLESMAN
BY
ATTORNEY Patented July 13, 1943

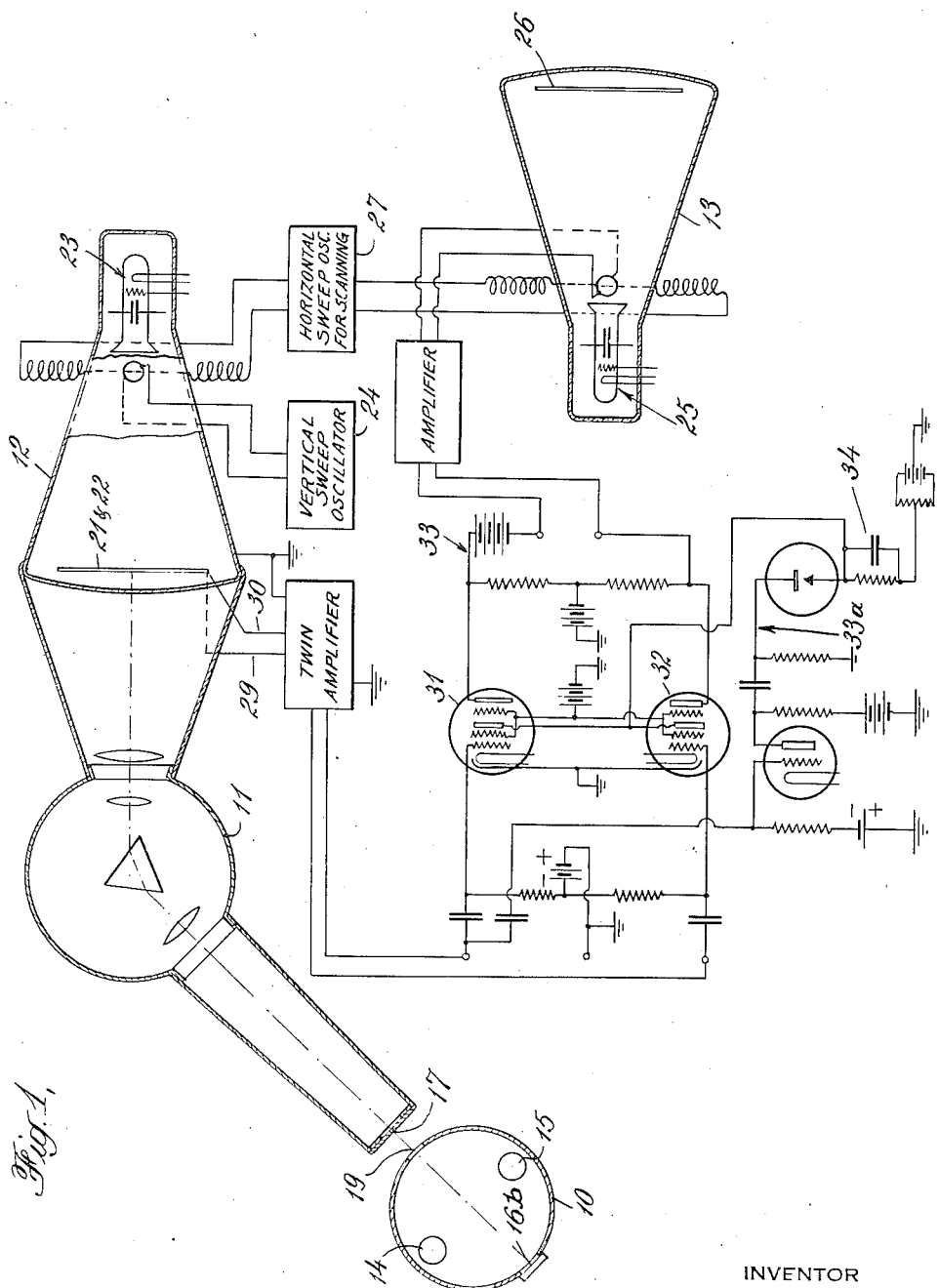

2,324,270

UNITED STATES PATENT OFFICE 2,324,270

MEANS FOR COMPARATIVE SPECTRAL ANALYSIS

Carleton H. Schlesman, Camden, N. J., assignor to Socony-Vacuum Oil Company, Incorporated, New York, N. Y., a corporation of New York Application August 28, 1940, Serial No. 354,476

1 Claim. (Cl. 88—14)

This invention is concerned with devices of the nature of comparative colorimeters. While color measurement and comparison offer the most usual field for the present invention, the device is widely applicable to wave energy between wave length limits far wider than the visual color area of the spectrum, for example in the infrared, ultraviolet, and X-ray regions.

The invention relates particularly to comparative colorimeters of the type in which two spectra, imposed on an electronic iconoscope, are caused to produce, in an electronic iconograph, a curve representing, in a visually steady image, the point-to-point ratio between the spectrum of a sample under examination and another spectrum which may be that of a standard sample, and the invention resides in the arrangement by which the said ratio is derived.

In order to more readily understand this invention, reference is made to the drawings attached to this specification, which show, in diagram form several of the many aspects of this invention. In these drawings Figure 1 shows a general diagram of the apparatus set-up, and Figures 2 and 3 show details thereof. Figure 4 shows the modifications used when operating as a simple comparative colorimeter. Figure 5 shows a varied schematic arrangement of the mosaics in iconoscope 12.

Referring now to Figure 1, we find the device to consist of an energy or light source housing 10, a spectroscope 11, a cathode ray iconoscope 12, and a cathode ray iconograph 13.

In source chamber 10 two lights or other sources of wave energy, 14 and 15, give off light, reflected from the mirror finished interior of 10, and impinging upon object 16. Object 16 is divided to present, side by side, an object to be evaluated and a standard for comparison, as will be explained in greater detail later. Passing from source chamber 10, the energy reflected from 16 passes through slit 17 into spectroscope 11 wherein the beam is dispersed in the usual fashion and focused upon twin mosaics, explained in detail later, which are placed in the iconoscope 12. The iconoscope has the usual electron gun 23, and the vertical sweep of the electron beam is produced in the usual manner by an oscillator 24. The iconograph has an electron gun 25, and a fluorescent plate or screen 26 on which the electrons impinge.

Turning to Figure 4, there is presented a vertical diagram of the arrangements around source 10. The object is divided horizontally into reference standard 16a and sample 16b. Sample and standard may be mounted or handled in any suitable way to present them for study at this point. For example, liquids may be in containers, or fabric samples, such as paper, and the like, may be continuously conveyed past a suitable viewing opening in 10. Such devices may take many forms and their specific form does not form a part of this invention. The reflected light from the objects passes through openings 19 in the side of 10 and proceeds through slit 17 into the spectroscope. In case it is desired to examine specimens by transmitted instead of by reflected light, a suitable closure for the reflection object space is provided and sample and reference are placed in the transmitted beams between 19 and 17 as at 20a and 20b.

The manner of operation is as follows:

For the sake of illustration, we may consider the spectrum as having been dispersed over an area say 3" wide and the optical system is chosen to yield a spectrum 1" high. This spectrum is divided horizontally to produce two comparison bands. If the standard sample is a pure white and if, for example, the test transmission sample is a bright, pure blue, then that portion of the spectrum corresponding to the standard will contain all wave lengths whereas the spectrum of the blue sample will contain only the blue wave lengths.

A suitable optical system is used to cause both spectra to fall upon mosaic surfaces 21 and 22 (Figures 1 and 2) which are photoelectrically sensitive and so constructed that secondary electrons or photoelectrons are evolved locally in direct proportion to the brilliance or energy content of the light striking each portion.

For the sake of simplicity, this surface will be described as a mosaic and will be considered as capable of acquiring a charge of energy and thereby emitting electrons from its rear surface when its front surface is illuminated.

By the use of a common saw-tooth oscillograph 27, simultaneous horizontal scanning is produced in both iconoscope and iconograph.

As it is to be expected that the photoelectric sensitivity of the photosensitive system will not be constant over the entire spectrum, some form of compensation is desired to achieve constant sensitivity. While this may be accomplished in a number of ways, the following will be used for purposes of illustration:

Assuming that the mosaic shows excessive sensitivity in the blue region, the amount of correction required is exactly determined. Compensating metal masks 35 are then constructed which are symmetrical in shape about the horizontal center line, and these are superposed on the mosaics 21 and 22 so as to define the active area of the mosaics in a vertical direction. This detail is shown in Figure 5.

It is desired to draw a curve in which the abscissa is the ratio of the transmission of the test sample to the transmission of a standard sample. This result is secured by deriving separate voltages, through the conductors 29 and 30, from the two mosaics 21 and 22, amplifying these voltages separately, and feeding them to the grids of two pentode vacuum tubes 31 and 32, which are arranged in a bridge circuit as shown in Figure 1. In this arrangement the output voltages of the two pentodes will be balanced when the two voltages from the iconoscope are balanced. As this corresponds to 100% on the scale, full deflection in the iconograph is secured by the use of a positive biasing potential provided by a battery, at 33, Figure 1. When 100% standard transmission is balanced against 0% sample transmission, the maximum unbalance occurs on the bridge circuit, and this completely overcomes the bias current from the battery 33, giving an indication of 0% ratio.

As the bridge current drops for a fixed ratio, as the light intensity falls, it is necessary to adjust the normal output voltages of the pentodes 31 and 32 in compensation. This is accomplished by the use of a screen grid tube circuit 33a which increase the voltage of the pentodes automatically as the signal strength from the standard falls.

The indicator may attempt to follow the positive and negative currents and blur the indication. This is prevented by the introduction of a suitable time constant in the grid circuits of the pick-up vacuum tubes, as, for example, by a condenser, 34, charged through a resistance.

I claim:

In a comparison colorimeter or the like, the combination of an electronic iconograph, an electronic iconoscope, means for producing two comparison spectra in the iconoscope, means for producing contemporaneous transverse scanning of the two spectra in the iconoscope, means for producing simultaneous longitudinal scanning in the iconoscope and the iconograph, a resistance bridge, amplifying means and circuit connections for conducting, to the terminals of the bridge, opposed voltages from the iconoscope corresponding, respectively, to the point-to-point densities of the two spectra, means, including output connections from the bridge terminals, for imparting energy to the transverse scanning means of the iconograph, and means, in series with said output connections and the bridge, for producing a constant biasing voltage equal to the imbalance between the said opposing voltages attributable to the maximum possible point-to-point contrast between the two spectra.

CARLETON H. SCHLESMAN.